Feb. 4, 1941.    J. B. THOMSON    2,230,393
AIRPLANE STRUCTURAL ELEMENT
Filed March 29, 1937    2 Sheets-Sheet 1
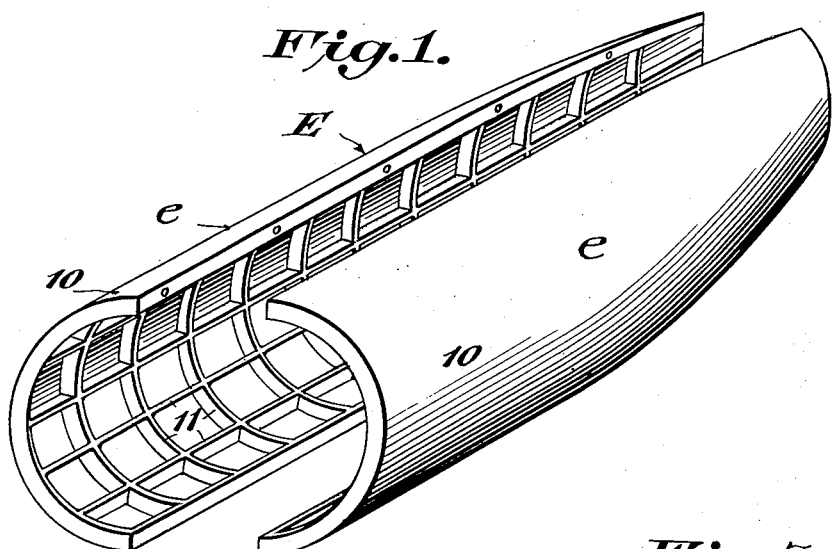
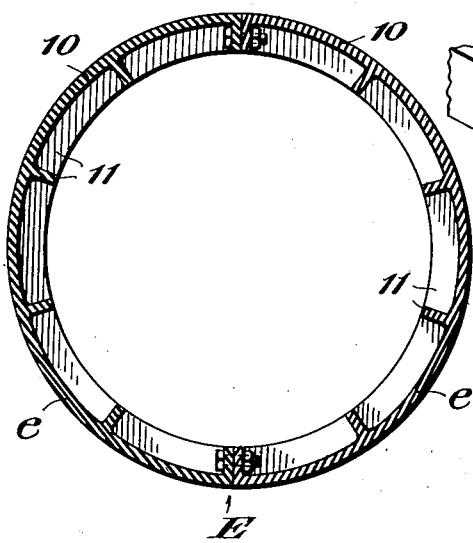
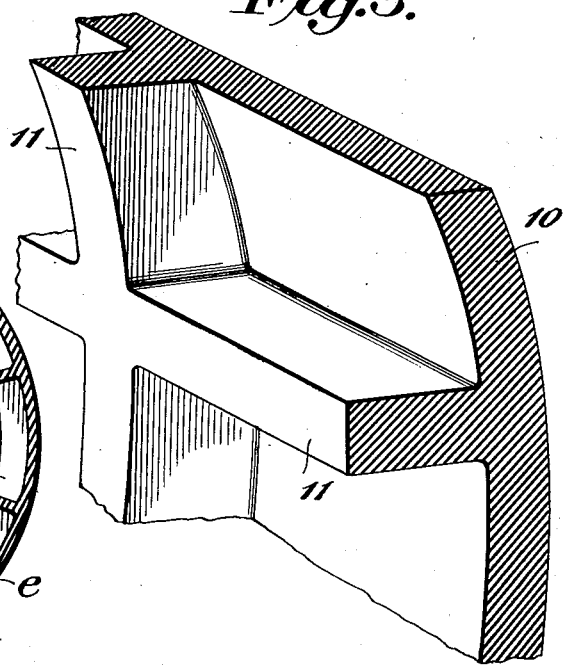
Inventor
John B. Thomson,
By D. P. Wolhaupter
Attorney

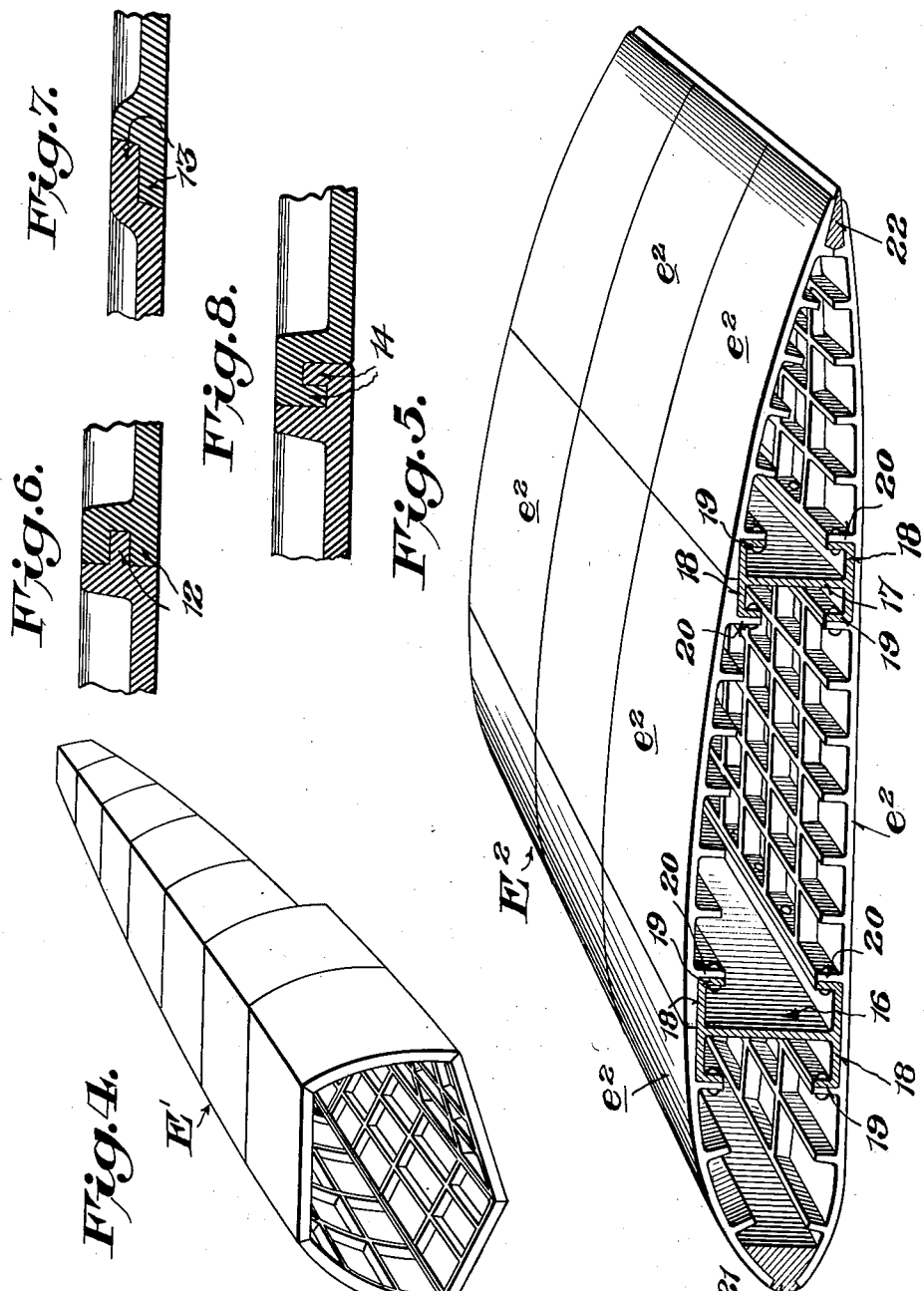

Patented Feb. 4, 1941

2,230,393

UNITED STATES PATENT OFFICE 2,230,393

AIRPLANE STRUCTURAL ELEMENT

John B. Thomson, Flushing, N. Y.

Application March 29, 1937, Serial No. 133,707

2 Claims. (Cl. 244—124)

REISSUED
JUL 1 - 1941

This invention relates to improvements in airplane structural elements such, for example, as fuselages, wings, tail surfaces, flying boat or amphibian hulls, seaplane floats and the like, and has for its general object to provide such elements at greatly reduced cost and in a form having numerous inherent advantages as compared with the cost and the form of corresponding elements provided according to present general practice, particularly to the end of enabling the low cost, quantity production of airplanes having various features of advantage over airplanes produced in accordance with present general practice.

Heretofore, airplane structural elements, such as those mentioned, have, as a general rule, been fabricated from ribs, stringers, bulkheads, braces, formers, gusset plates, skins or walls and the like, welded, riveted, bolted, screwed, nailed, glued or otherwise fastened together—usually by skilled hand labor. Production costs have, as a consequence, been extremely high. Moreover, despite the care exercised in designing and fabricating such elements, it has proved to be very difficult to approximate complete, ideal streamlining of the same, due to the difficulties experienced in attempting to avoid sharp angles at corners and other locations. Furthermore, when bolts, rivets or screws have been employed as fasteners, the heads of the same have disadvantageously protruded beyond the outer faces of the structural elements.

According to the present invention, airplane structural elements such as those mentioned are moulded, cast, pressed or otherwise formed, either sectionally or as complete one-piece units, including all necessary reinforcements, from plastic material. Thereby, production costs are greatly reduced; the elements may be standardized for economical quantity production, and higher aerodynamic efficiencies may be obtained because of the practicability of ideally streamlining the elements and providing them with smooth exterior surfaces. In addition, numerous other advantages inherently are obtained such for example, as stability, strength, vibration and sound dampening, and fireproofing and resistance to acids and the elements when the plastic employed is of a fireproof, acid and element resisting nature.

The present structural elements may be moulded, cast, pressed or otherwise formed, either sectionally or as complete units, from any suitable thermo-plastic material or composition possessing requisite strength and durability when hard. If they are formed sectionally they preferably are provided with suitable mating formations whereby they may readily be fastened together in unitary form, either by means of bolts, screws, glue, cement or the like, or by fusion through the use of a solvent. Regardless of whether they are formed sectionally or as complete, one-piece units, they are provided internally, with integral ribs, flanges or the like, wherever necessary and in any desired relationship, to impart to the elements all requisite stiffness and strength.

In the accompanying drawings, which are illustrative of the invention:

Figure 1 is a perspective view of a portion of an airplane fuselage formed sectionally in accordance with the invention, the sections being shown in separated relationship.

Figure 2 is a cross section through the structure shown in Fig. 1.

Figure 3 is an enlarged detail perspective view of a fragment of the structure shown in Fig. 1.

Figure 4 is a perspective view of a portion of a seaplane float formed sectionally in accordance with the invention.

Figure 5 is a perspective view of a portion of an aircraft wing formed sectionally in accordance with the invention; and Figures 6, 7 and 8 are detail sectional views illustrating some different types of mating formations with which related edges of the different sections may be provided.

It will be understood, of course, that the fuselage, float and wing elements shown in the drawings and each designated generally as E, E' and $E^2$, respectively, are representative of various other airplane structural elements which may be moulded, cast, pressed or otherwise formed from suitable thermo-plastic material, either sectionally or in one-piece, in accordance with the invention.

In the present instance the fuselage element E is illustrated as being comprised by duplicate half-sections e, e to be fastened together in any suitable maner to form the complete unit. Each section e comprises a skin or wall 10 of any suitable thickness stiffened and reinforced by internal ribs or flanges 11 and having, preferably a smooth outer face of desired streamline shape, the flanges 11 being integral with said wall and of any suitable thickness and depth and being disposed in any suitable relationship to each other. In the present instance some of the ribs or flanges 11 extend circumferentially of the walls 10 and others extend longitudinally thereof. They may, however, extend in any other manner. In any event, where angularly related ribs or flanges meet, they preferably are integral with each other, thereby imparting greater stiffness and strength to the walls 10. Moreover, certain of said ribs or flanges may extend along the meeting edges of the sections as shown for the reception of bolts or other suitable fasteners for securing the sections together. Alternatively the meeting edges of the sections may be formed as illustrated in either of Figs. 6, 7 or 8 or in any other suitable manner to be fastened together either by bolts, screws, glue, cement or the like, or by fusion through the use of a solvent or by heat or in any other suitable manner. In this connection the sections may, for example, be formed at their adjacent edges with interfitting tongues and grooves as generally indicated at 12 in Fig. 7, or with overlapping formations as generally indicated at 13 in Fig. 8, or with interengaging hook formations as generally indicated at 14 in Fig. 9.

The seaplane float E' shown in Fig. 4 is illustrated as being formed sectionally both longitudinally and transversely and as being composed of more than two sections transversely as distinguished from the half-section fuselage element construction shown in Fig. 1. Obviously, the fuselage element E or any similar element may be sectionally constructed in the manner of the seaplane float shown in Fig. 4, or the latter, or any similar element, may be sectionally constructed in the manner of the fuselage element shown in Fig. 1, employing any of the joints illustrated between the sections.

Figure 5 of the drawings illustrates a practical manner of sectionally forming an aircraft wing in accordance with the invention. Front and rear wing spars 16 and 17 of I-section are provided having the free end portions of their top and bottom flanges 18 directed downwardly and upwardly, respectively, as indicated at 19, and top and bottom elements $e^2$ formed in accordance with the invention as heretofore described, span the space between said spars and have front and rear marginal portions overlying and underlying said top and bottom flanges, respectively. In addition, said elements $e^2$ have ribs or flanges 20 abutting the portions 19 of the spars whereby the latter are held properly spaced apart and whereby bolts, rivets or other suitable fasteners may be employed by being passed through said flanges 20 and portions 19 to secure the sections $e^2$ and the spars rigidly together. A nose block 21 is provided and other sections $e^2$ extend from said nose block to the front spar 16, these latter sections being secured at their rear ends to said front spar in the same manner as the sections first mentioned and being secured at their front ends to the nose block 21 in any suitable manner. Other sections $e^2$ are secured at their front ends to the rear spar in the same manner as the first mentioned sections and at their rear ends said last mentioned sections are fastened either directly together or to a strip 22 the equivalent of the nose block 21. Alternatively, the sections $e^2$ in advance of the front spar and behind the rear spar may, if desired, be of one-piece construction. In any event, the wing is, or may be, of smooth exterior form and, generally speaking, embodies all of the essential features of the invention described in connection with Figs. 1 to 4.

It is known that airplane structural elements have heretofore been formed from laminations or layers of flexible or plastic material impregnated with a phenolic condensation product and baked under pressure to afford homogeneous structures of great strength and rigidity. However, many of the disadvantages heretofore mentioned in respect to the general prior practice are inherent to the forming of structural elements from laminations or layers of plastic material impregnated with a phenolic condensation product and are avoided by the present invention due to molding, casting or pressing of the elements, or element sections, directly from the plastic material, as distinguished from building up a laminate structure and impregnating it and as distinguished from employing means other than ribs, flanges or the like composed of the plastic material itself for stiffening and reinforcing purposes.

By forming airplane structural elements directly from suitable plastic material the various disadvantages heretofore mentioned are overcome and the various advantages heretofore enumerated are obtained. In other words, according to the present invention, airplane structural elements may be standardized and may be manufactured at comparatively low cost in perfectly streamlined form with smooth outer surfaces devoid of protuberances, and, at the same time, they may be provided readily and easily with all necessary ribs, flanges, fillets or the like to impart to any given element all requisite strength and rigidity.

Without further description it is thought that the features and advantages of the invention will be readily apparent to those skilled in the art, and it will of course be understood that changes in the form, proportion and minor details of construction may be resorted to, without departing from the spirit of the invention and scope of the appended claims.

I claim:

1. In an aircraft structure, a spar of I-section including a web and end flanges, a least one of said end flanges having inturned marginal portions, a plurality of body units formed of plastic material and provided with marginal portions disposed in overlying relationship to the end flange of said spar which has said inturned marginal flanges, the edges of the marginal portions of said body units being disposed in abutting relationship, flanges integral with said body units abutting the inturned marginal portions of the said flange of said spar, and means fastening said body unit flanges to the inturned portions of the said flange of said spar.

2. An aircraft structure as set forth in claim 1 in which the body units have smooth outer surfaces collectively forming a smooth, continuous outer surface, and in which intersecting reinforcing ribs integral with said units and with each other and integrated with the attaching flanges of the units, extend inwardly from said units.

JOHN B. THOMSON.